United States Patent
Haase et al.

(10) Patent No.: US 9,292,955 B1
(45) Date of Patent: Mar. 22, 2016

(54) SEQUENCING OF ANIMATIONS IN SOFTWARE APPLICATIONS

(71) Applicant: Google Inc., Mountain View, CA (US)

(72) Inventors: Chet Haase, Pleasanton, CA (US); Romain P. Guy, Millbrae, CA (US)

(73) Assignee: Google Inc., Mountain View, CA (US)

( * ) Notice: Subject to any disclaimer, the term of this patent is extended or adjusted under 35 U.S.C. 154(b) by 506 days.

(21) Appl. No.: 13/735,561

(22) Filed: Jan. 7, 2013

Related U.S. Application Data (60) Provisional application No. 61/583,574, filed on Jan. 5, 2012.

(51) Int. Cl.
*G06T 13/00* (2011.01)
*G06T 13/80* (2011.01)

(52) U.S. Cl.
CPC .................................... *G06T 13/80* (2013.01)

(58) Field of Classification Search
None
See application file for complete search history.

(56) References Cited

U.S. PATENT DOCUMENTS

| | | | |
|---|---|---|---|
| 6,115,053 A | 9/2000 | Perlin | |
| 6,154,222 A | 11/2000 | Haratsch | |
| 6,608,624 B1 | 8/2003 | Wang | |
| 7,197,710 B2 | 3/2007 | Faraday | |
| 2004/0222992 A1* | 11/2004 | Calkins et al. | 345/473 |
| 2006/0232589 A1* | 10/2006 | Glein | 345/473 |
| 2010/0156911 A1 | 6/2010 | Zhao | |
| 2013/0009965 A1* | 1/2013 | Kato et al. | 345/474 |

FOREIGN PATENT DOCUMENTS

EP 1887524 A4 2/2012

OTHER PUBLICATIONS

"Animation in Honeycomb | Android Developers Blog," [online][Retrieved on Jun. 4, 2014]; Retrieved from the Internet URL: http://android-developers.blogspot.com/2011/02/animation-in-honeycomb.html, 6 pages.
"AnimatorSet | Android Developers," [online][Retrieved on Jun. 4, 2014]; Retrieved from the Internet URL: http://developer.android.com/reference/android/animation/AnimatorSet.html, 9 pages.
"Codedependent: Introducing ViewPropertyAnimator," [online] [Retrieved on Jun. 4, 2014]; Retrieved from the Internet URL: http://graphics-geek.blogspot.com/2011/06/introducing-viewpropertyanimator.html, 6 pages.
"Introducing ViewPropertyAnimator | Android Developers Blog," [online] [Retrieved on Jun. 4, 2014]; Retrieved from the Internet URL: http://android-developers.blogspot.com/2011/05/introducing-viewpropertyanimator.html, 5 pages.

* cited by examiner

*Primary Examiner* — James A Thompson
*Assistant Examiner* — Xilin Guo
(74) *Attorney, Agent, or Firm* — Fish & Richardson P.C.

(57) ABSTRACT

Methods, systems, and apparatus, including computer programs encoded on a computer storage medium, for defining a sequence of animations for changing visible and non-visible values of objects. One or more programmatic calls is received, the calls including animations and sequencing for their performance. Consecutive frames of the animations are displayed according to the animations and the sequencing defined in the programmatic calls. Non-displayed properties of the objects in the animations are changed in coordination with the displaying of the consecutive frames.

19 Claims, 5 Drawing Sheets

*102*

AnimatorSet animSet = new AnimatorSet().play(anim0).before(anim1).after(anim2)

Anim1

Anim0

Anim2

Result

SEQUENCING OF ANIMATIONS IN SOFTWARE APPLICATIONS

CROSS-REFERENCE TO RELATED APPLICATION

This application claims priority to U.S. Provisional Application Ser. No. 61/583,574, filed on Jan. 5, 2012, the entire contents of which are hereby incorporated by reference.

TECHNICAL FIELD

This document relates to animating items in software applications.

BACKGROUND

Software applications on modern computing devices can be very visually compelling things. Long past are simple green characters on a blank, black background. Even business applications now implement graphical user interfaces that include beautiful selectable controls, extensive coloring and shading, and even animating display elements, such as buttons or other visible elements that move around the screen, become updated with new data and graphics, and otherwise perform all sorts of movements and changes that make a piece of software more compelling for a user.

Such animations can often involving moving multiple objects simultaneously and in complex ways in which the objects may interact with each other—not just moving a single item from point X to point Y. As a very simple example, consider the addition into the middle of a display contacts list, which may require moving items on each side of the insertion outward, and then moving or fading the new contact in. Each of these motions needs to be choreographed by a software developer in a manner that is natural and understandable to the user and to the developer.

SUMMARY

This document discusses systems and techniques by which software developers can develop and implement animations for software applications they are developing and coding. The techniques may be implemented in development tools, such as those provided in a software developer kit (SDK) for a computer operating system. Mobile devices such as smartphones, tablets, and other devices that may have touchscreen displays may benefit, as may desktop computers and other devices having any sort of graphical user interface (GUI).

In one example, multiple animations of distinct objects that are to be displayed on a computing device may be combined into a set of coordinated animations. The performance of that set of animations may be triggered by a single programmatic call that identifies both the animations and the sequencing of the animations. Such sequencing may include whether particular ones of the animations are to be performed simultaneously or sequentially, and whether there are to be delays in any portions of the animation execution (e.g., to cause two animations to align with each other). Each of the animations may be separately defined from the programmatic call, and may be defined simply by its name. The sequencing information may be identified in the programmatic call by parameters of the call that have been defined in an application programming interface (API). The changes carried out by the animations may affect both visible and non-visible elements.

From that basic programmatic call, an operating system may carry out the animations defined in the call according to the sequences defined in the call. First, the call may be parsed to identify that it is a call for an animation sequence, and to identify particular animations and sequencing information that is defined in the call. Such information may then be used to construct the animation sequence with the particular identified animations being child animations for that sequence. The definitions for each of the child animations may also be obtained. Elements of the graphics system may combine such information to identify the relative state of each of the animations during an animation period from the time that the overall animation sequence (which may include multiple child animations) begins to the time it ends. The system may work recursively to compute new values for every sequential frame of each child animation. The values for each child animation may then be implemented for the objects targeted by that animation, both for visible and non-visible components of the system. The visible components are, of course, those components that a user of a device can see as an animation is performed, such as moving, rotating, or fading visible objects on a display of a computing device. The non-visible components may include locations at which selection of an object generates certain results. For example, if an image of a button that has two selectable areas is moved by an animation, then the areas where the clicks can occur (and have predefined effects, such as kicking off one or more other animations) will also be updated.

In certain implementations, such techniques may provide one or more advantages. Software developers can add animations to their code in a relatively simple manner, even for complex, multi-part animations that have a lot of moving parts that must be coordinated with each other. The code may also be easier to read and be more descriptive, at the same time. For example, if a programmatic call simply identifies particular animations, along with parameters that define sequencing, a reader of the code can immediately understand how the animations will be carried out when the code is executed. In this manner, a developer can create code more quickly, and may be induced to include more impressive user interface elements by the fact that such inclusion has been made relatively easy.

In general, innovative aspects of the subject matter described in this disclosure may be embodied in methods that include the actions of receiving one or more programmatic calls that include parameters that define one or more animations, each animation having one or more parameters defining properties of objects to be animated in particular ways, and sequencing for performance of the one or more animations; obtaining visual display information about the one or more animations, the visual display information defining objects to be animated, and actions to be performed on the objects to be animated; repeatedly generating, for consecutive frames of the animations, updated values for displaying objects in the animations; and automatically displaying the consecutive frames of the animations in order, as defined in the one or more programmatic calls, and changing non-displayed properties of the objects in the animations in coordination with the displaying of the consecutive frames.

In some implementations, a single programmatic call is used.

In some implementations, the programmatic calls may define dependencies that link performance of pairs of animations by the computing device.

In some implementations, one of the programmatic calls may reference a function for building a set of animations to start together. The function may include at least one instruction, which may be either an instruction to start a first animation at the same time as a second animation or an instruction to start a first animation directly after a second animation has ended. Furthermore, the function may include both an instruction to start a first animation at the same time as a second animation and an instruction to start a third animation either directly before or directly after the first animation has ended In some implementations, the sequencing may be defined by parameters of the call that are defined by a public application programming interface for an animation system. The sequencing may be defined by a call whose name defines sequential or simultaneous animation of the one or more items.

Some implementations may further include the action of generating an animation sequencing object having the one or more animations as child animations and the sequencing of the animations according to the one or more programmatic calls.

Other implementations of this aspect include corresponding systems, apparatus, and computer programs, configured to perform the actions of the methods, encoded on computer storage devices.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
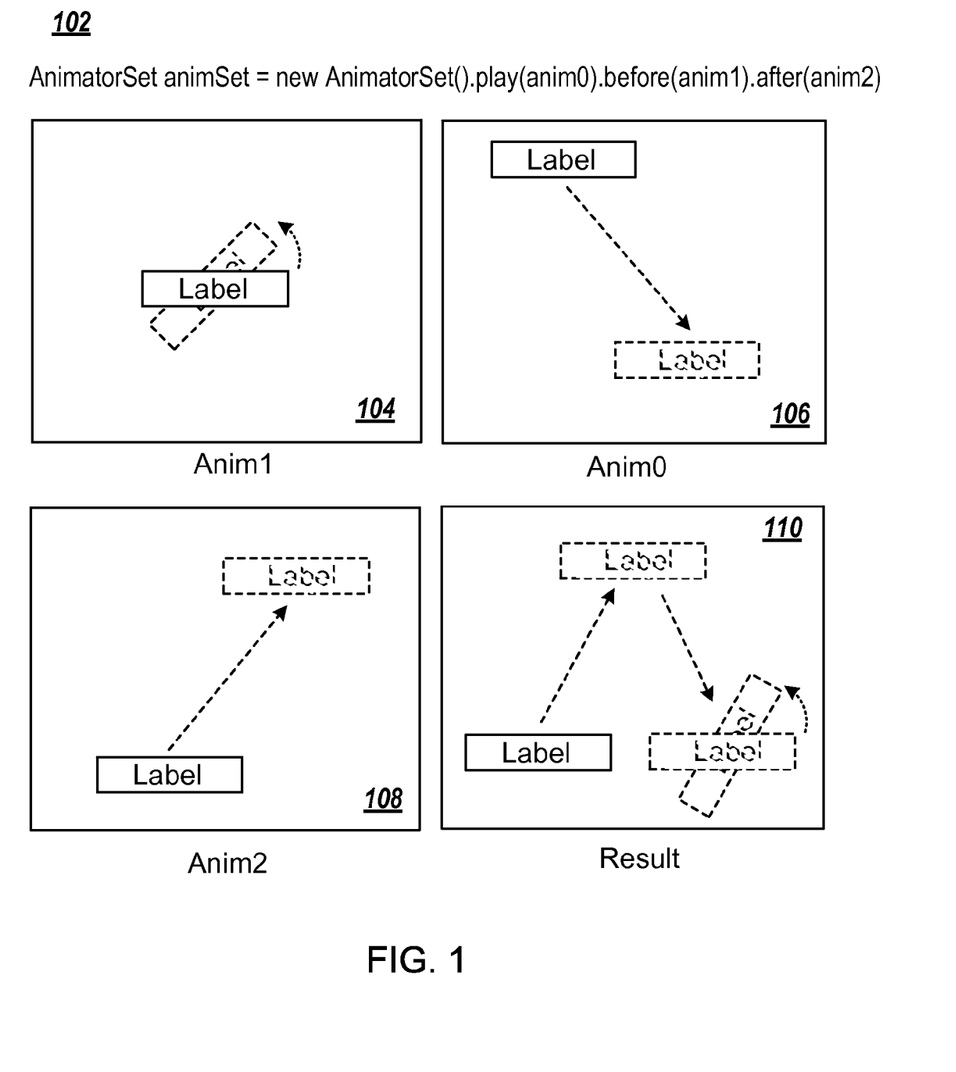
FIG. 1 shows an example of compositing sequenced animations using a simple programmatic call.

FIG. 1 shows an example of compositing sequenced animators using a simple programmatic call 102. The call 102 choreographs three animators by means of the play( ), before( ), and after( ) functions. As shown in FIG. 1, the Animator Set object animSet is defined in the call 102 as:

AnimatorSet( ).play(anim0).before(anim1).after(anim2);

The play( ) function is called with anim0 as the argument. This function is a basic function by which an Animator Set, that is an animation sequence object, can be constructed. The animator taken as an argument in the play( ) function acts as the temporal referent for before( ), after( ) and with( ) commands, all of which are preceded by the play( ) command. In the present example, anim0 is a translation animation for a label as illustrated by the diagram 106 of FIG. 1.

The before( ) function is called with anim1 as the argument. The animator taken as an argument in the before( ) function plays sequentially at the conclusion of the animator taken by play( ). In the present example, anim1 is a rotation animation for the label as illustrated by the diagram 104 of FIG. 1.

The after( ) function is called with anim2 as the argument. The animator taken as an argument in the after( ) function plays prior to the animator taken by the play( ) function; that is, the animator referenced in the play( ) function begins after the animator in the after( ) function has finished. In the present example, anim2 is a translation animation for the label as illustrated by the diagram 108 of FIG. 1.

The result, as shown in the diagram 110, is that the animations occur in the sequence set for the animators 104, 106, and 108. First, the anim2 animator 108 plays, translating the graphical object up and to the right. Second, the anim0 animator 106 plays, translating the graphical object down and to the right. Third, the anim1 animator 104 plays, rotating the object.

This entire choreography is constructed easily as a single simple function call. The user need not specify timing offsets or chain the operations by means of multiple sequencing tools. The function call provides a straightforward, organic solution to sequencing animators by building the Animator Set.

As another example, consider the following programmatic call:

AnimatorSet( ).play(anim0).after(500).before(anim1);

Here, the after( ) function takes an integer as an argument, representing a number of milliseconds for which to pause. The result of executing this call is that the anim0 animator will play after a half-second pause. The anim1 animator will play after the anim0 animator has completed.

A third example uses the with( ) function:

AnimatorSet( ).play(anim0).with(anim1).after(anim2);

The with( ) function takes the animator anim1 as the argument. The with( ) function is used in order to play an animator in parallel with the animator taken by the play( ) function. According to this call, the anim2 animator will play first, and then the anim0 and anim1 animators will play together.

Each of these examples is based around the use of a Builder object, which is created by means of the play( ) function. The initial play( ) method tells the Builder which animator (anim0 in each of the above examples) is the dependency for succeeding commands to the Builder. Multiple function calls (for instance, multiple uses of the before( ) or after( ) functions) again set dependency on the animator taken by play( )—so, for instance, play(anim0).before(anim1).before(anim2) would cause both of the animators anim1 and anim2 to play after anim0 ends.

The play( ) function returns a Builder object that constructs the Animator Set based on the dependencies outlined in the called to play( ) and the other methods (after, before, and with)

Because the Builder is returning an Animator Set having a defined sequence of animators, any properties associated with the animators can be modified by means of the system. For example, both visible and non-visible components can be manipulated by means of these animators.

Figure 2:
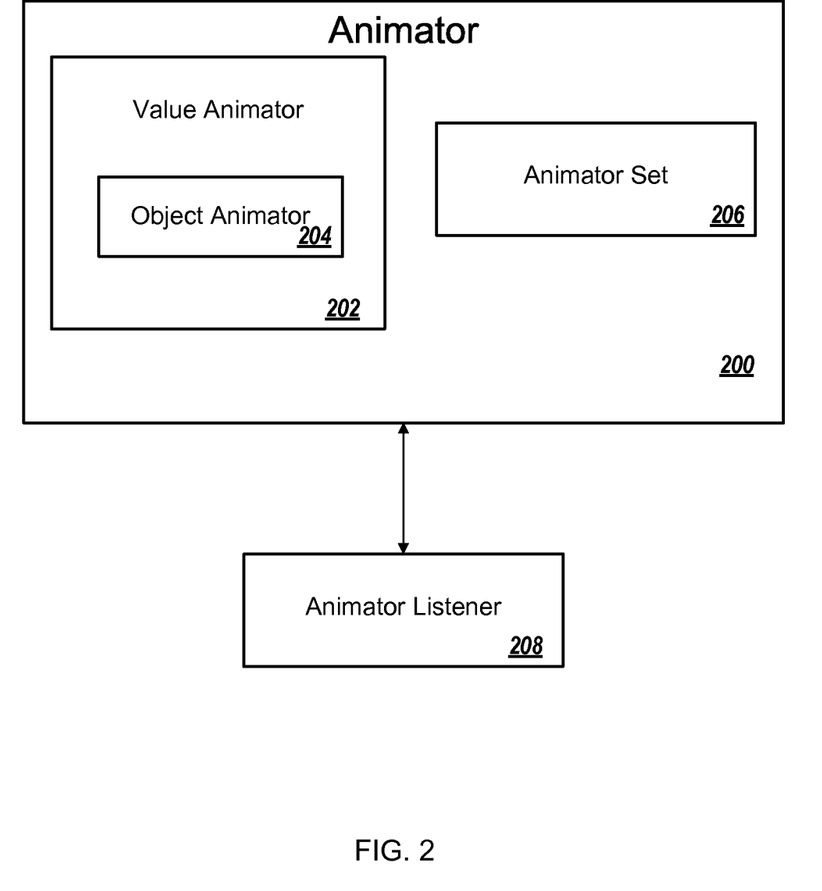
FIG. 2 is a schematic diagram of classes for providing sequenced animations.

These components are not found explicitly in the function call that generates the AnimatorSet.Builder object, but are instead defined by the animators themselves. Upon starting the Animator Set, each of the including animators is executed in the sequence specified by the Animator Set, changing the visible display properties of objects as specified as well as changing the underlying, non-visible properties of the objects FIG. 2 is a schematic diagram of classes for providing sequenced animations. The Animator superclass 200, as described above, includes classes and tools to allow for basic and advanced animation support and sequencing.

The Value Animator class 202 provides a simple timing engine for running animations which calculate animated values and set them on target objects. All animations run on a single timing pulse, and the Value Animator may use a custom handler or other synchronization mechanism to ensure that the property changes implemented by the Value Animator occur in the UI.

The Value Animator can be thought of as the workhorse for the use of the Animator superclass to manage animations. The Value Animator runs the timing of animations; it determines and calculates values associated with animators.

A subclass within the Value Animator class 202 is the Object Animator class 204, which provides support for animating properties on target objects. Using the timing and calculations provided by the Value Animator, the Object Animator animates a value and associates that value with an object or property. The Object Animator uses the "set" function associated with the underlying property name and object in order to set the value to that object as appropriate.

Note that any value that can be set with an appropriate "set" function can be used by the Value Animator class 202 and Object Animator class 204 in order to change that value, and the value is actually changed by playing of the animator—that is, the properties of the underlying objects are altered, so that components both visible and not visible are altered.

As another class within the Animator superclass 200, the Animator Set class 206 manages the relative timing of multiple animators.

Methods available for the Animator Set class allow the building of a sequence of animators using different function calls, including playTogether( ) and playSequentially( ). The playTogether( ) function accepts individual animators or an array of animators as arguments, and starts playing each of the animators in parallel. The playSequentially( ) function instead plays them in order, with each one beginning after the last one ends.

Also available as functions for the Animator Set are setDuration( ), setInterpolator( ), setStartDelay( ), and setTarget( ), each of which allows the designer to customize the properties of the Animator set in choreographing the animators. The setDuration( ) and setStartDelay( ) functions both deal with the timing of the entire sequence. The setInterpolator( ) function deals with the time interpolator, which determines the manner in which the animation runs. The setTarget( ) function sets the target object for each of the animators, which will determine which property will be animated (as is therefore most relevant when the animators are members of the Object Animator class 204).

Additionally, and as described above, the Animator Set class 206 has the play( ) function, which constructs a Builder object within the Animator Set object. The builder object, or animSet.Builder for our generic named Animator Set, can be used to order any number of different animators within the Animator Set relative to a single reference animator. Further order relationships among other animators, not including the reference animator, can be defined in subsequent play( ) commands if desired. But in some implementations, the entire sequence can be choreographed by use of only a single play( ) command.

An interface related to the Animator superclass 200 is the Animator Listener interface 208. This interface 208 is notified when certain events occur associated with an animator. In some embodiments, the Animator Listener interface 208 may be notified when the Animator starts, ends, repeats, or cancels. This allows the developer to include a variety of actions in response to different events relative to the animator. For example, a command can be set to trigger in response to onAnimationCancel( ), that is, when a given animator cancels during execution.

Figure 3:
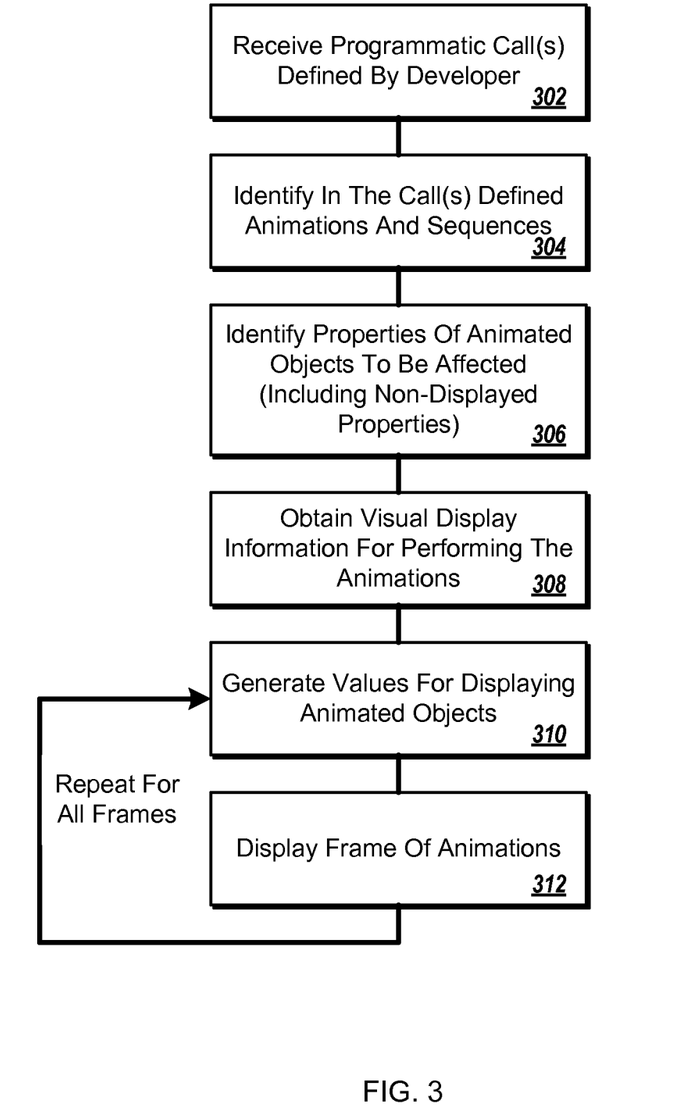
FIG. 3 is a flow chart of a process for implemented animations defined by a software developer.

FIG. 3 is a flow chart of a process for implemented animations defined by a software developer. Although expressed as a certain sequence that relates most closely to the steps as they are represented in source code, it will be understood that the source code is then compiled for execution. The run-time execution of these steps may no longer be as distinct as expressed in the source code. In any event, some implementations may exclude or reorder steps described in FIG. 3

The computing system receives a programmatic call defined by a developer 302. As in the examples above, this call may be a function call associated with a play( ) or equivalent function, and the call may involve one or more animation objects as arguments. The programmatic call allows the developer to quickly, in a single command, define the relationships necessary to sequence a number of animations. The call may express the names of the animation objects and give their relative relationships for sequencing. To use an example, our eponymous Animation Set animSet may be defined as follows:

AnimationSet( ).play(anim0).with(anim1).before(anim2).after(anim3)

The animation objects to be sequenced and their sequences are identified as defined by the call 304. Because the designer designated animation names, and the order in which they should run, in the call itself, this step is a matter of parsing the information provided.

Using our example, the animators anim0, anim1, anim2, and anim3 are identified. Their relationships are also identified: anim3 is played before anim0, anim0 and anim1 are played together, and anim2 is played after anim0. As shown by the example, these relationships are defined in the function call, which is straightforward and explicit for the developer.

The properties of animated objects to be affected are identified (306). This step may occur in execution when compiling each animator, as the animator itself will define a target object and properties to change during animation. As explained above, in some embodiments, any property with an associated "set" function may be affected by an animator, whether or not that property involves visual display.

Some properties of objects affect other properties implicitly, and so in some embodiments it is important that the use of the "set" function be fully robust—that is, it is in the use of the "set" function that whether or not all visible and non-visible properties of an object are changed as appropriate.

Visual display information is obtained for performing the animations (308). This may involve collaboration with a graphics system in order to determine the properties and capabilities of the existing display. Here, components of the graphics system may affect the animation process, generating layers and other rendering objects and generally assuring that the display will be rendered in accordance with the visual properties of the objects as they are animated.

Values are then generated for each of the animated objects (310). These values may include all explicit and underlying values being changed by the animation process. As this may represent the first frame of a long animation sequence, it will be understood that some values may be interpolated and set to values different than either the starting or ending values made explicit in one or more animation objects.

A frame of animation is displayed, exhibiting the generated values where appropriate (312). Because some of the values changed by the animation objects may not be visual, the visual display may not exhibit all changed values; in fact, in some cases no change may be observed at all.

For the entire animation sequence, the steps 310 and 312 repeat to carry through the animation sequence specified by the programmatic call. Some animation objects may be executed before others and may specify different rates or earlier conclusions than others. Therefore some frames of animation may not exhibit any change in values for some objects, while other objects may change in value. Delays (that is, explicit frame-based or time-based pauses in program execution) may also be part of the animation sequence, such that some frames may not involve any value change for any of the targeted objects at all.

Figure 4:
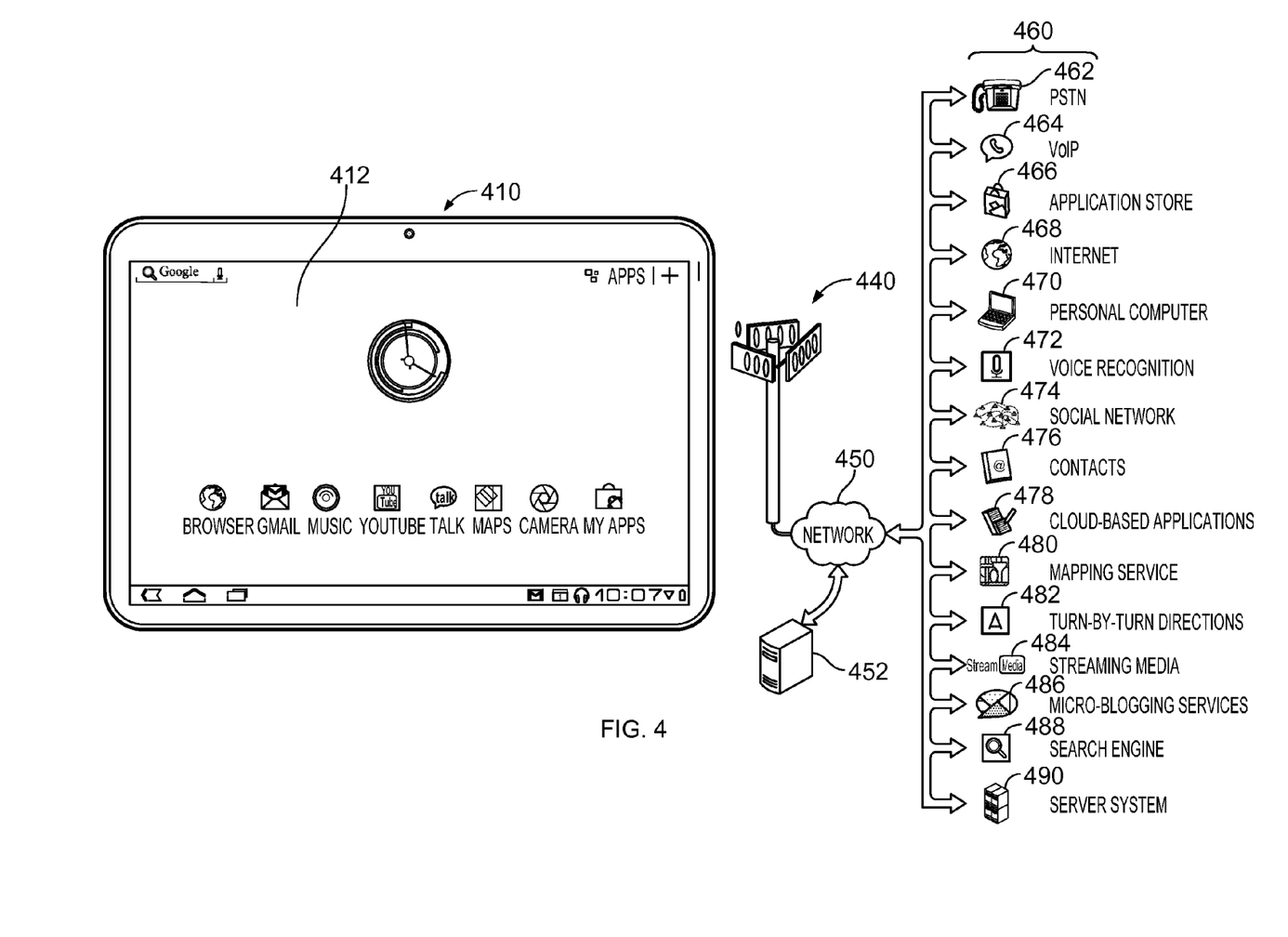
FIG. 4 is a conceptual diagram of a system that may be used to implement the systems and methods described herein.

Referring now to FIG. 4, a conceptual diagram of a system that may be used to implement the systems and methods described in this document is illustrated. In the system, a computing device 410 can wirelessly communicate with base station 440, which can provide the mobile computing device with wireless access to numerous hosted services 460 through a network 450.

In this illustration, the mobile computing device 410 is depicted as a tablet device that includes a touchscreen display 412 for presenting content to a user of the mobile computing device 410 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard, physical buttons, trackballs, accelerometers, gyroscopes, and magnetometers).

Example visual output mechanism in the form of display device 412 may take the form of an LED or AMOLED display with resistive or capacitive touch capabilities, for displaying video, graphics, images, and text, and coordinating user touch inputs locationally with the displayed information so that user contact above a displayed item may be associated with the item by the device 410. The mobile computing device 410 may take alternative forms also, including as a laptop computer, a mobile telephone, a slate computer, a personal digital assistant, an embedded system (e.g., a car navigation system), a desktop personal computer, or a computerized workstation.

An example mechanism for receiving user-input includes a "virtual" keyboard displayed on the touchscreen display 412 or a physical keyboard (not shown), which may be a full qwerty keyboard or a traditional keypad that includes keys for the digits '0-9', '*', and '#.' The keyboard receives input when a user physically contacts or depresses a keyboard key. User manipulation of a trackball or interaction with a trackpad enables the user to supply directional and rate of rotation information to the device 410 (e.g., to manipulate a position of a cursor on the display device 412).

The device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive physical buttons (not shown). Additionally, the mobile computing device may include buttons for adjusting volume output by the one or more speakers (not shown), and a button for turning the mobile computing device on or off. A microphone allows the device 410 to convert audible sounds into an electrical signal that may be digitally encoded and stored in computer-readable memory, or transmitted to another computing device. The device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard. User-selection of the button may invoke the pre-defined action.

In some examples, the operating system provides a "desktop" user interface that is displayed upon turning on the computing device 410, activating the device 410 from a sleep mode, upon "unlocking" the mobile computing device 410, or upon receiving user-selection of a physical button on the computing device 410. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The computing device 410 may include other application modules and hardware. Where the computing device 410 is a mobile telephone, a call handling unit may receive an indication of an incoming telephone call and provide a user capabilities to answer the incoming telephone call. A media player may allow a user to listen to music or play movies that are stored in local memory of the computing device 410. The device 410 may include a digital camera sensor, and corresponding image and video capture and editing software. An internet browser may enable the user to view content from a web page by typing in an addresses corresponding to the web page or selecting a link to the web page.

The computing device 410 may include an antenna to wirelessly communicate information with the base station 440. The base station 440 may be one of many base stations in a collection of base stations (e.g., a mobile telephone cellular network) that enables the computing device 410 to maintain communication with a network 450 as the computing device 410 is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the computing device 410 and computing devices associated with the services 460.

The network 450 may connect the computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the computing device 410. Conversely, the computing device 410 may send a communication to the service provider server system 452 initiating a telephone call with a telephone number that is associated with a device accessible through the PSTN 462.

The network 450 may connect the computing device 410 with a Voice over Internet Protocol (VoIP) service 464 that routes voice communications over an IP network, as opposed to the PSTN. For example, a user of the computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the computing device 410 the ability to browse a list of remotely stored application programs that the user may download over the network 450 and install on the computing device 410. The application store 466 may serve as a repository of applications developed by third-party application developers. An application program that is installed on the computing device 410 may be able to communicate over the network 450 with server systems that are designated for the application program. For example, a VoIP application program may be downloaded from the Application Store 466, enabling the user to communicate with the VoIP service 464.

The computing device 410 may access content on the internet 464 through network 450. For example, a user of the computing device 410 may invoke a web browser application that requests data from remote computing devices that are accessible at designated universal resource locations. In various examples, some of the services 460 are accessible over the internet.

The computing device 410 may communicate with a personal computer 470. For example, the personal computer 470 may be the home computer for a user of the computing device 410. Thus, the user may be able to stream media from his personal computer 470. The user may also view the file structure of his personal computer 470, and transmit selected documents between the computerized devices.

A voice recognition service 472 may receive voice communication data recorded with the computing device's microphone (not shown), and translate the voice communication into corresponding textual data. In some examples, the translated text is provided to a search engine as a web query, and responsive search engine search results are transmitted to the computing device 410.

The computing device 410 may communicate with a social network 474. The social network may include numerous members, some of which have agreed to be related as acquaintances. Application programs on the computing device 410 may access the social network 474 to retrieve information based on the acquaintances of the user of the mobile computing device. For example, an "address book" application program may retrieve telephone numbers for the user's acquaintances. In various examples, content may be delivered to the computing device 410 based on social network distances from the user to other members. For example, advertisement and news article content may be selected for the user based on a level of interaction with such content by members that are "close" to the user (e.g., members that are "friends" or "friends of friends").

The computing device 410 may access a personal set of contacts 476 through network 450. Each contact may identify an individual and include information about that individual (e.g., a phone number, an email address, and a birthday). Because the set of contacts is hosted remotely to the computing device 410, the user may access and maintain the contacts 476 across several devices as a common set of contacts.

The computing device 410 may access cloud-based application programs 474. Cloud-computing provides application programs (e.g., a word processor or an email program) that are hosted remotely from the computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the computing device 410 with street maps, route planning information, and satellite images. An example mapping service is GOOGLE MAPS. The mapping service 480 may also receive queries and return location-specific results. For example, the computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the computing device 410. For example, computing device 410 may request a stream for a pre-recorded video file, a live television program, or a live radio program. Example services that provide streaming media include YOUTUBE and PANDORA.

A micro-blogging service 486 may receive from the computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 5:
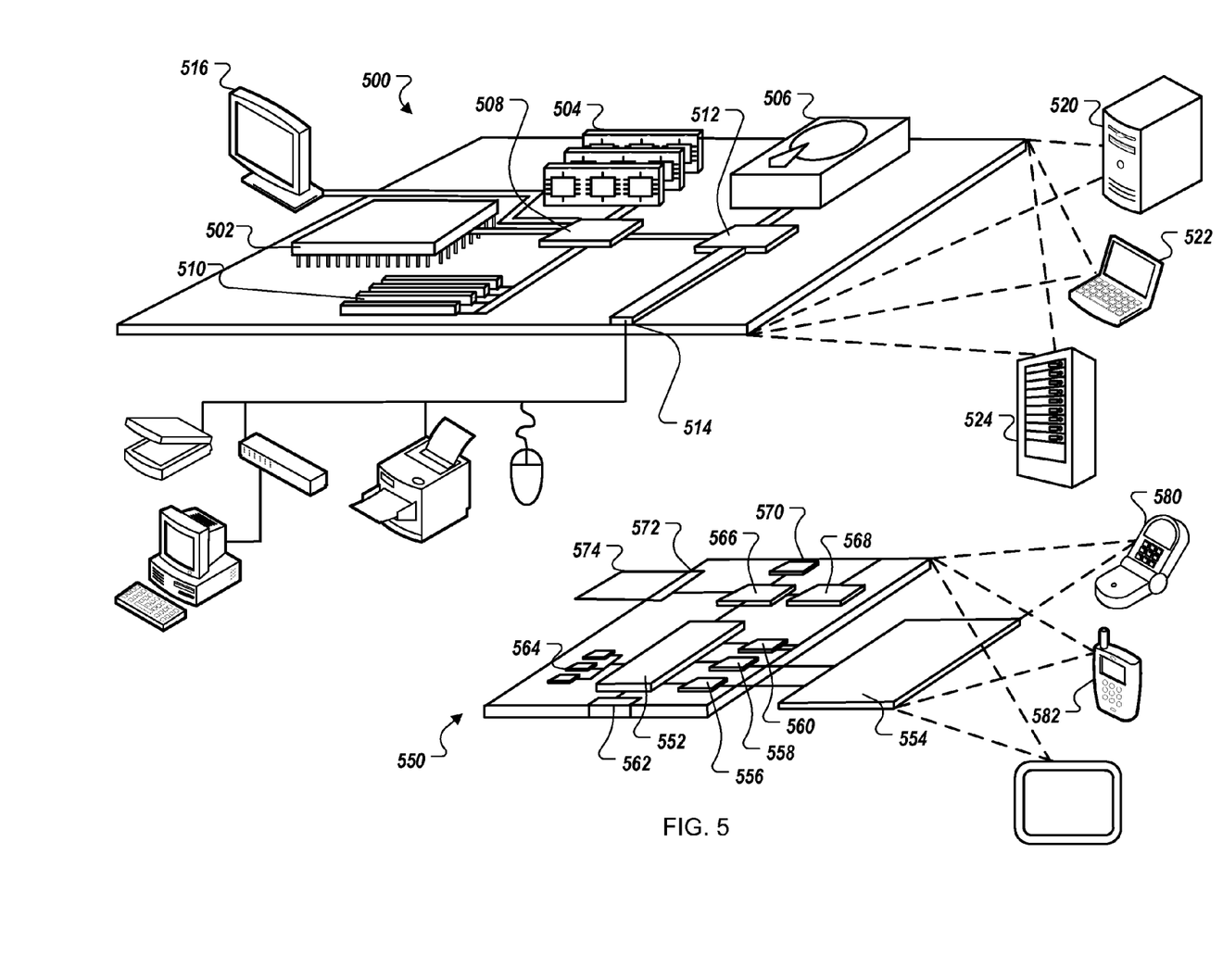
FIG. 5 shows an example of a computer device and a mobile computer device that can be used to implement the techniques described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as tablet devices, personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 1512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. The device may be provided with a subscriber identity module (SIM) card that stores a key for identifying a subscriber with a telecommunications carrier to enable communication through the carrier. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet device 584, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed:

1. A computer-implemented computer animation method comprising:
   receiving one or more programmatic calls that each include parameters that indicate:
      one or more animations, each animation having one or more parameters that define properties of objects to be animated in particular ways, and
      sequencing for performing the one or more animations, wherein the parameters of the call that indicate the sequencing are defined by a public application programming interface for an animation system;
   in response to receiving the one or more programmatic calls that include parameters that indicate one or more animations and sequencing for performing the one or more animations, obtaining visual display information about the one or more animations, the visual display information defining objects to be animated, and actions to be performed on the objects to be animated;
   repeatedly generating, for consecutive frames of the one or more animations, updated values for displaying objects in the one or more animations; and
   automatically displaying the consecutive frames of the one or more animations in order, as defined in the one or more programmatic calls, and changing non-visible components of the objects that do not affect a visual appearance of the objects in the animations in coordination with the displaying of the consecutive frames.

2. The computer-implemented method of claim 1, wherein the one or more programmatic calls is a single programmatic call.

3. The computer-implemented method of claim 1, wherein the one or more programmatic calls define dependencies that link performance of pairs of animations by the computing device to each other.

4. The computer-implemented method of claim 1, wherein one of the one or more programmatic calls references a function for building a set of animations to start together with each other.

5. The computer-implemented method of claim 4, wherein the function for building the set of animations to start together comprises at least one of:
   an instruction to start a first animation at the same time as a second animation, and
   an instruction to start a first animation directly after a second animation has ended.

6. The computer-implemented method of claim 5, wherein the function for building the set of animations to start together comprises an instruction to start a first animation at the same time as a second animation and an instruction to start a third animation either directly before or directly after the first animation has ended.

7. The computer-implemented method of claim 6, wherein the sequencing is defined by a call whose name defines sequential or simultaneous animation of the one or more objects.

8. The computer-implemented method of claim 1, further comprising:
   generating an animation sequencing object, the sequencing object comprising the one or more animations as child animations and the sequencing of the animations occurring according to the one or more programmatic calls.

9. A non-transitory computer-readable medium storing software comprising instructions executable by one or more computers which, upon such execution, cause the one or more computers to perform operations comprising:
   receiving one or more programmatic calls that include parameters that indicate:
      one or more animations that each have one or more parameters that define properties of objects to be animated in particular ways, and
      sequencing for performing the one or more animations, wherein the parameters of the call that indicate the sequencing are defined by a public application programming interface for an animation system;
   in response to receiving the one or more programmatic calls that include parameters that indicate one or more animations and sequencing for performing the one or more animations, obtaining visual display information about the one or more animations, the visual display information defining objects to be animated, and actions to be performed on the objects to be animated;
   repeatedly generating, for consecutive frames of the one or more animations, updated values for displaying objects in the one or more animations; and
   automatically displaying the consecutive frames of the one or more animations in order, as defined in the one or more programmatic calls, and changing non-visible components of the objects that do not affect a visual appearance of the objects in the animations in coordination with the displaying of the consecutive frames.

10. The non-transitory computer-readable medium of claim 9, wherein the one or more programmatic calls is a single programmatic call.

11. The computer-implemented method of claim 9, wherein the one or more programmatic calls define dependencies that link performance of pairs of animations.

12. The computer-implemented method of claim 9, wherein one of the one or more programmatic calls references a function for building a set of animations to start together with each other.

13. The computer-implemented method of claim 12, wherein the function for building the set of one or more animations to start together comprises at least one of an instruction to start a first animation at the same time as a second animation and an instruction to start a first animation directly after a second animation has ended.

14. The computer-implemented method of claim 13, wherein the function for building the set of one or more animations to start together comprises an instruction to start a first animation at the same time as a second animation and an instruction to start a third animation either directly before or directly after the first animation has ended.

15. A system comprising:
one or more processors and one or more storage devices storing instructions that are operable, when executed by the one or more processors, to cause the one or more processors to perform operations comprising:
receiving one or more programmatic calls that include parameters that indicate:
one or more animations that each have one or more parameters that define properties of objects to be animated in particular ways, and
sequencing for performing the one or more animations, wherein the parameters of the call that indicate the sequencing are defined by a public application programming interface for an animation system;
in response to receiving the one or more programmatic calls that include parameters that indicate one or more animations and sequencing for performing the one or more animations, obtaining visual display information about the one or more animations, the visual display information defining objects to be animated, and actions to be performed on the objects to be animated;
repeatedly generating, for consecutive frames of the one or more animations, updated values for displaying objects in the one or more animations; and
automatically displaying the consecutive frames of the one or more animations in order, as defined in the one or more programmatic calls, and changing non-visible components of the objects that do not affect a visual appearance of the objects in the animations in coordination with the displaying of the consecutive frames.

16. The system of claim 15, wherein the one or more programmatic calls is a single programmatic call.

17. The system of claim 15, wherein the one or more programmatic calls define dependencies that link performance of pairs of animations.

18. The system of claim 15, wherein one of the one or more programmatic calls references a function for building a set of animations to start together with each other.

19. The system of claim 18, wherein the function for building the set of one or more animations to start together comprises at least one of an instruction to start a first animation at the same time as a second animation and an instruction to start a first animation directly after a second animation has ended.

* * * * *